(12) United States Patent
Chang et al.

(10) Patent No.: US 10,476,723 B2
(45) Date of Patent: Nov. 12, 2019

(54) DISCOVERY AND NETWORKING OF PROXIMATE WIRELESS DEVICES BY ACOUSTIC MESSAGING

(71) Applicant: Dewmobile Inc., Grand Cayman (KY)

(72) Inventors: Shangpin Chang, San Jose, CA (US); Xiaodong Wang, Saratoga, CA (US); Steve X. Gu, Palo Alto, CA (US)

(73) Assignee: Dewmobile Inc., Grand Cayman (KY)

( * ) Notice: Subject to any disclaimer, the term of this patent is extended or adjusted under 35 U.S.C. 154(b) by 0 days.

(21) Appl. No.: 15/841,150

(22) Filed: Dec. 13, 2017

(65) Prior Publication Data

US 2018/0103365 A1    Apr. 12, 2018

Related U.S. Application Data

(63) Continuation of application No. 14/341,787, filed on Jul. 26, 2014, now Pat. No. 9,918,213.

(60) Provisional application No. 61/989,696, filed on May 7, 2014.

(51) Int. Cl.
| | |
|---|---|
| *H04L 27/26* | (2006.01) |
| *H04W 56/00* | (2009.01) |
| *H04L 1/00* | (2006.01) |
| *H04W 8/00* | (2009.01) |
| *H04W 4/02* | (2018.01) |

(52) U.S. Cl.
CPC ........ *H04L 27/2656* (2013.01); *H04L 1/0045* (2013.01); *H04L 27/2675* (2013.01); *H04W 56/001* (2013.01); *H04W 4/023* (2013.01); *H04W 8/005* (2013.01)

(58) Field of Classification Search
CPC ... H04L 1/0045; H04L 7/042; H04L 27/2656; H04L 27/2675; H04J 3/06
See application file for complete search history.

(56) References Cited

U.S. PATENT DOCUMENTS

| | | | |
|---|---|---|---|
| 6,704,346 B1 | 3/2004 | Mansfield | 375/136 |
| 2001/0010604 A1* | 8/2001 | Esumi | G11B 27/3027 360/49 |
| 2002/0159531 A1* | 10/2002 | Reagan | H04L 27/2656 375/260 |

(Continued)

*Primary Examiner* — Kevin C. Harper
(74) *Attorney, Agent, or Firm* — Helen Mao; Imperium Patent Works

(57) ABSTRACT

Apparatus and method are provided for discovery and networking of proximate devices using acoustic messaging. In one novel aspect, a peer discovery protocol is used to discover proximate devices using voting messages encoded in ultrasonic waveform. In one embodiment, the UE receives one or more voting messages from neighboring UEs encoded in ultrasonic waveform, builds its voting message and broadcasts the voting message encoded in ultrasonic waveform. In another embodiment, based on the voting result, a multi-tier wireless LAN is established by the master UEs through two RF interfaces. In another novel aspect, an optimized synchronization by the receiver is used to locate the transmitted frame boundary of the ultrasonic message. In one embodiment, the UE reversed-looks up a pre-calculated boundary-offset table to estimate the tone boundary and searches the maximum synchronization tone energy down to per sampling interval using a predefined search algorithm to optimize locating the tone boundary.

9 Claims, 8 Drawing Sheets

(56) References Cited

U.S. PATENT DOCUMENTS

| | | |
|---|---|---|
| 2005/0197136 A1 | 9/2005 | Friday et al. ............... 455/456.1 |
| 2005/0201301 A1 | 9/2005 | Bridgelall ..................... 370/254 |
| 2006/0122504 A1 | 6/2006 | Gabara et al. ................ 600/437 |
| 2006/0140410 A1 | 6/2006 | Aihara .......................... 380/273 |
| 2008/0304604 A1* | 12/2008 | Oh .......................... H04L 7/042 |
| | | 375/345 |
| 2010/0144283 A1 | 6/2010 | Curcio et al. ................ 455/66.1 |
| 2010/0254298 A1 | 10/2010 | Lee .............................. 370/313 |
| 2013/0143555 A1 | 6/2013 | Singh et al. .................. 455/434 |
| 2013/0250801 A1 | 9/2013 | Kennedy et al. ............. 370/254 |
| 2013/0301391 A1 | 11/2013 | Altman et al. ................ 367/100 |

* cited by examiner

DISCOVERY AND NETWORKING OF PROXIMATE WIRELESS DEVICES BY ACOUSTIC MESSAGING

CROSS REFERENCE TO RELATED APPLICATIONS

This application is a continuation, and claims priority under claims priority under 35 U.S.C. § 120 from nonprovisional U.S. patent application Ser. No. 14/341,787, entitled "DISCOVERY AND NETWORKING OF PROXIMATE WIRELESS DEVICES BY ACOUSTIC MESSAGING," filed on Jul. 26, 2014, the subject matter of which is incorporated herein by reference. Application Ser. No. 14/341,787, in turn claims priority under 35 U.S.C. § 119 from U.S. Provisional Application No. 61/989,696 entitled "A DISCOVERY AND NETWORKING METHOD OF PROXIMATE WIRELESS DEVICES BY ACOUSTIC MESSAGING," filed on May 7, 2014, the subject matter of which is incorporated herein by reference.

TECHNICAL FIELD

The present invention relates generally to networking of wireless devices and, more particularly, methods and apparatus for discovery and networking of proximate wireless devices by acoustic messaging.

BACKGROUND

With the exponential growth of the wireless services and mobile subscribers, mobile social applications and data sharing among wireless devices or user equipments (UEs) have seen enormous success and rich development. An important prerequisite of these applications is peer proximity discovery. The current applications rely on absolution location acquired through network location services, such as Global Positioning System (GPS) or cellular geolocation. For example, depending on the availability, a social application client periodically reports its physical location coordinates to a network server. The social application client, in turn, acquires information of other nearby devices by sending requests to the network servers.

Such approach is limited by the accuracy of the location information as well the availability and condition of the network services. For example, GPS data may not be available for indoor environment and the location provided by geolocation may be miles away. Further, the traditional network location services require network connections to a centralized database, normally, through Internet. Therefore, the availability of Internet connections and/or the condition of the Internet connection can also limit the availability or accuracy of the location service.

Improvements and enhancements are required to provide more efficient and reliable location services for proximity discovery.

SUMMARY

Apparatus and method are provided for discovery and networking of proximate devices using acoustic messaging.

In one novel aspect, a peer discovery protocol is used to discover proximate devices using voting messages encoded in ultrasonic waveform. In one embodiment, the UE receives one or more voting messages from neighboring UEs. The voting messages are encoded in ultrasonic waveform. The UE builds its voting message based on the received voting message and broadcasts the voting message encoded in ultrasonic waveform. In one embodiment, the voting message includes at least a message type, a device ID and a self-candidate score. The message type is predefined to indicate a self-election of a role the UE. In another embodiment, the UE enters a master mode based on the peer discovery process. The UE in the master mode connects with other slave-mode UEs to form a wireless LAN. In yet another embodiment, the UE enters a slave mode based on the peer discovery process. The UE in the slave mode associates with the master UE to join the wireless LAN. In one embodiment, a multi-tier wireless LAN is established using ultrasonic messaging. The master UE receives information of other master UEs from the slave UEs associated with it. The master UE connects with other master UEs using a second RF module to form a second tier wireless LAN.

In another novel aspect, an optimized synchronization by a receiver is used to locate the transmitted frame boundary of an ultrasonic message in multi-user environment. In one embodiment, the ultrasonic message includes a long duration pilot tone followed by a one-frame sync tone. The receiver detects a predefined number of pilot tones, detects the synchronization tone in a recorded frame and determines the transition frame with respect to the recorded sync frame. The UE uses the sync-to-pilot tone energy-ratio in the transition frame to estimate a boundary offset value. In one embodiment, a pre-calculated boundary-offset table is used for run-time lookup. The boundary-offset table lists pre-calculated one-frame sync-to-pilot tone energy-ratio values in the granularity of a sampling interval based on a frequency band of the pilot tone, a frequency band of the synchronization tone, and the offset sampling intervals to the tone boundary. In another embodiment, a progressive synchronization procedure is used to locate the tone boundary to the granularity of samples. The UE searches the maximum synchronization tone energy with one-frame worth samples in the vicinity of the estimated pilot-sync tone boundary using a predefined search algorithm. In one embodiment of the current invention, the search algorithm is a binary search.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

To address the limitations of the conventional network-based location services, methods and apparatus are provided to rely on neither absolute positioning nor centralized server assistance. Instead, the common components of a wireless device, namely the speaker and the microphone, are used to generate and receive ultrasonic signal to and from neighboring peers and to propagate discovery to indirect devices. After peer discovery, a multi-tier wireless LAN can be established to interconnect the devices.

Figure 1:
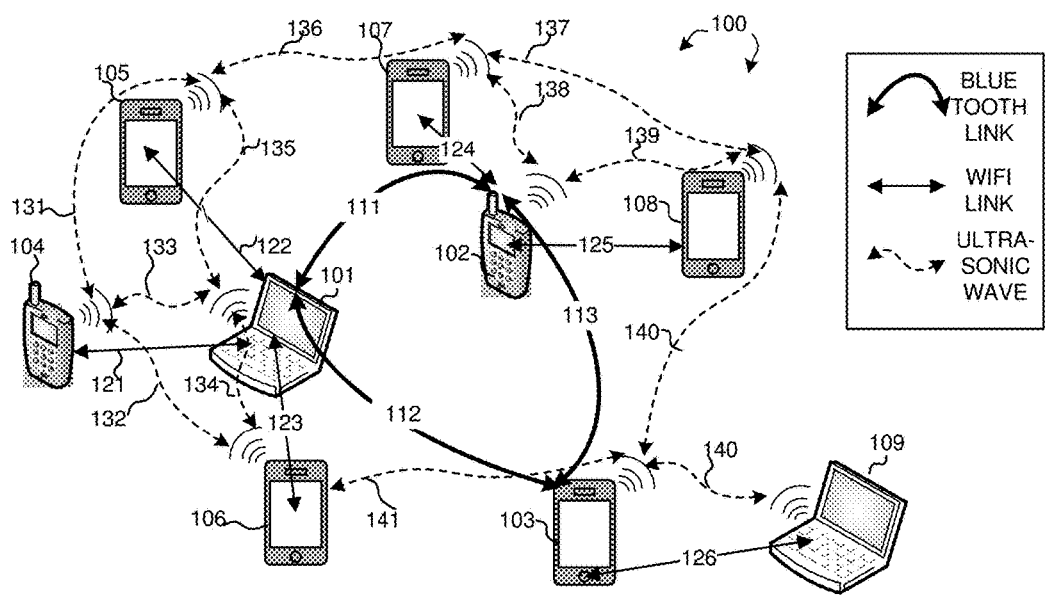
FIG. 1 is an exemplary diagram of a two-tier wireless LAN system in accordance with embodiments of the current invention.

FIG. 1 is an exemplary diagram of a two-tier wireless LAN system 100 in accordance with embodiments of the current invention. Multiple UEs, 101 to 109 of different types are in proximity to establish a wireless LAN. UEs 101 to 109 start discovery process by broadcasting peer discovery messages in ultrasonic waveform. UEs 101 to 109 listen to peer discovery messages from neighbor UEs. The peer discovery message includes device identification (ID), and a self-candidate score for the device to become a master UE, such as a Wi-Fi access point. In one embodiment, the self-candidate score is the weighted sum of the battery level and the CPU performance grade of UE 101. UE 101 has direct neighbors 104, 105 and 106. UE 102 has direct neighbors 107 and 108. UE 103 has direct neighbor 109 and 106. Each UE receives discovery messages encoded in ultrasonic waveform from ultrasonic links 131 to 141. After a discovery process using peer communication through the ultrasonic messages, UEs 101, 102, and 103 are voted to be master UEs by their peer UEs, which enter into slave mode. The voted master UEs 101, 102 and 103 enters master UE mode. In one embodiment of the current invention, each master UE, such as UE 101, 102 and 103, converts to Wi-Fi access point mode and broadcasts its service set identification (SSID). Each slave-mode UE scans for master SSID it voted for and connects to the selected master UE. Master UE 101 is connected with UE 104, 105 and 106 through Wi-Fi link 121, 122 and 123, respectively. Similarly, Master UE 102 is connected with UE 107 and 108 through Wi-Fi link 124 and 125, respectively. Master UE 103 is connected with UE 109 through Wi-Fi link 126.

In one embodiment of the current invention, multi-tier wireless LAN can be established. As illustrated, UE 106 voted UE 101 as the Master UE. UE 106 is also a direct neighbor of another Master UE 103 through ultrasonic link 141 and has the information of Master UE 103. Upon establishing Wi-Fi connection with Master UE 101 and registered with Master UE 101, UE 106 supplies ID of Master UE 103 to Master UE 101. Master UE 101, upon receiving the peer Master UE information, connects with peer Master UE 103 with link 112. Similarly, UE 105 voted UE 101 as its master UE. UE 105 is also a direct neighbor of UE 107 through ultrasonic link 136 and has information of Master UE 102 through voting messages from UE 107. Upon establishing Wi-Fi connection with Master UE 101 and registered with Master UE 101, UE 105 supplies ID of Master UE 102 to Master UE 101. Master UE 101, upon receiving the peer Master UE information, connects with peer Master UE 102 with link 111. Similarly, UE 108 voted UE 102 as its master UE. UE 108 is also a direct neighbor of Master UE 103 through ultrasonic link 140 and has information of Master UE 103. Upon establishing Wi-Fi connection with Master UE 102 and registered with Master UE 102, UE 108 supplies ID of Master UE 103 to Master UE 102. Master UE 102, upon receiving the peer Master UE information, connects with peer Master UE 103 with link 113. In one embodiment of the current invention, links 111, 112 and 113 are Bluetooth links.

Wi-Fi links are illustrated as the first layer peer link and Bluetooth links are illustrated as the second layer peer link. It is known to one of ordinary skills in the art that any other types of wireless links in any other combinations can be used to establish a multi-tier wireless LAN using the ultrasonic messaging for proximity discovery.

Figure 2:
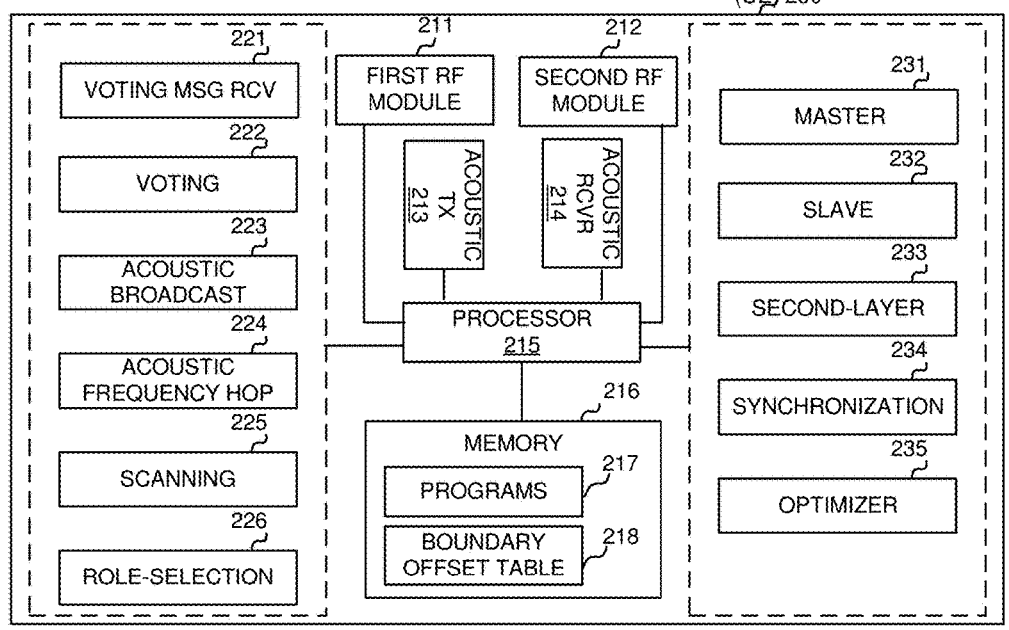
FIG. 2 illustrates a simplified block diagram of a UE in accordance with novel aspects of the current invention.

FIG. 2 illustrates a simplified block diagram of a UE 200 in accordance with novel aspects of the current invention. UE 200 comprises a memory 216, a processor 215, a first RF module 211, a second RF module 212, an acoustic transmitter 213 and an acoustic receiver 214. Acoustic transmitter 213 broadcast encoded peer discovery messages in ultrasonic waveform. Acoustic receiver 214 receives peer discovery messages encoded in ultrasonic waveform and passes to processor 215 to process. Executable programs 217 reside in memory 216. A boundary-offset lookup table 218 also resides in memory 216.

UE 200 also comprises various function modules including a voting message receiver module 221, a voting module 222, an acoustic broadcast module 223, an acoustic frequency hopping module 224, a scanning module 225, a role-selection module 226, a master module 231, a slave module 232, a second-layer module 233, a synchronization 234 and optimizer module 235.

Voting message receiver 221 receives acoustic signals from acoustic receiver 214 and decodes the voting messages encoded in ultrasonic waves. Voting module 222 builds a local voting message based on the received voting messages. Acoustic broadcast module 223 modulates the local voting message with ultrasonic wave to be broadcasted through acoustic transmitter 213. Acoustic frequency hopping module 224 selects a different acoustic frequency for a different local voting message based on predefined algorithm and notifies acoustic broadcast module 223 to modulate the local voting message to the selected frequency. Scanning module 225 scans ultrasonic wave bands to look for a band where a pilot tone presents. Role-selection module 226 self-selects either a master role or a slave role for UE 200 based on the received neighbor voting messages. Master module 231 switches UE 200 to master mode to host the wireless communication. In one embodiment of the current invention, Master module 231 switches UE 200 to a Wi-Fi access point mode. Slave module 232 associates UE 200 with the selected master UE through first RF module 211. In one embodiment of the current invention, Slave module 232 supplies IDs of other master UEs to the connected master UE. Second layer module 233 receives IDs of other master UEs through a plurality of connected slave UEs and established second-layer connection through second RF module 212.

Synchronization module 234 detects a predefined number of pilot tones from a data stream and detects the synchronization tone in a recorded frame. Optimizer module 235 searches maximum synchronization tone energy with one-frame worth samples near the estimated pilot-sync tone boundary using a predefined search algorithm and determines an optimized pilot-sync tone boundary based on the search. In one embodiment of the current invention, the predefined search algorithm is a binary search.

Figure 3:
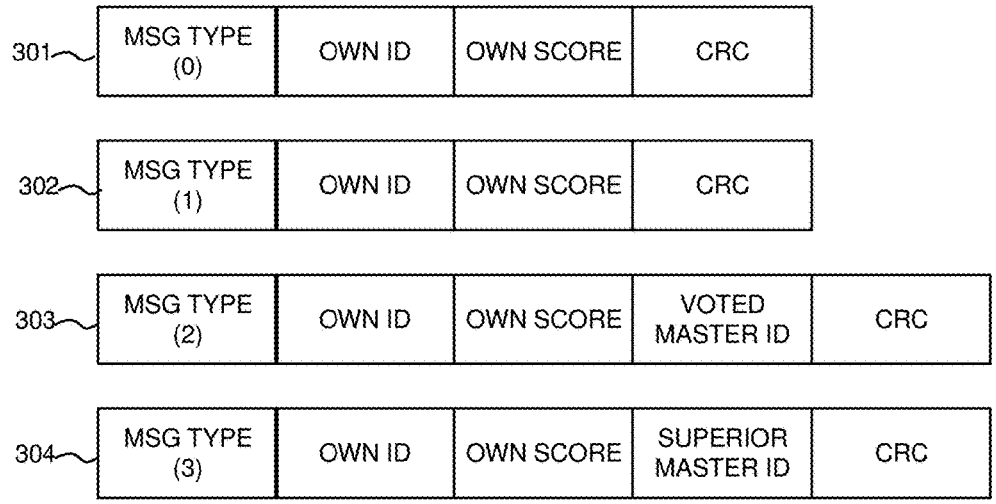
FIG. 3 shows details of voting messages for peer discovery in accordance with embodiments of the current invention.

In one novel aspect of the current invention, a discovery protocol uses different peer discovery messages. FIG. 3 shows details of voting messages for peer discovery in accordance with embodiments of the current invention. A message 301 is Type-0 message. Type-0 message includes message type, own ID, own score and cyclic redundancy check (CRC). After commanded by the user to start peer discovery, a UE always starts broadcast voting message with type-0 message. If no neighbor is found, the UE continues broadcasting type-0 messages. The UE collects information of neighbor UEs from received neighbor voting messages. A message 302 is Type-1 message. Type-1 message includes message type, own ID, own score, and CRC. As soon as the first neighbor is found, the UE switches to type-1 message if the UE has the winning score, otherwise, the UE switches to type-2 message. A message 303 is Type-2 message. Type-2 message includes message type, own ID, own score, voted master ID and CRC. Type-2 messages votes for a master UE that is a better UE to be the master. The voted master ID is included in type-2 message. A message 304 is Type-3 message. Type-3 message includes message type, own ID, own score, superior master ID and CRC. If the UE receives a vote and later finds a better master UE, the UE switches to type-3 message.

Figure 4:
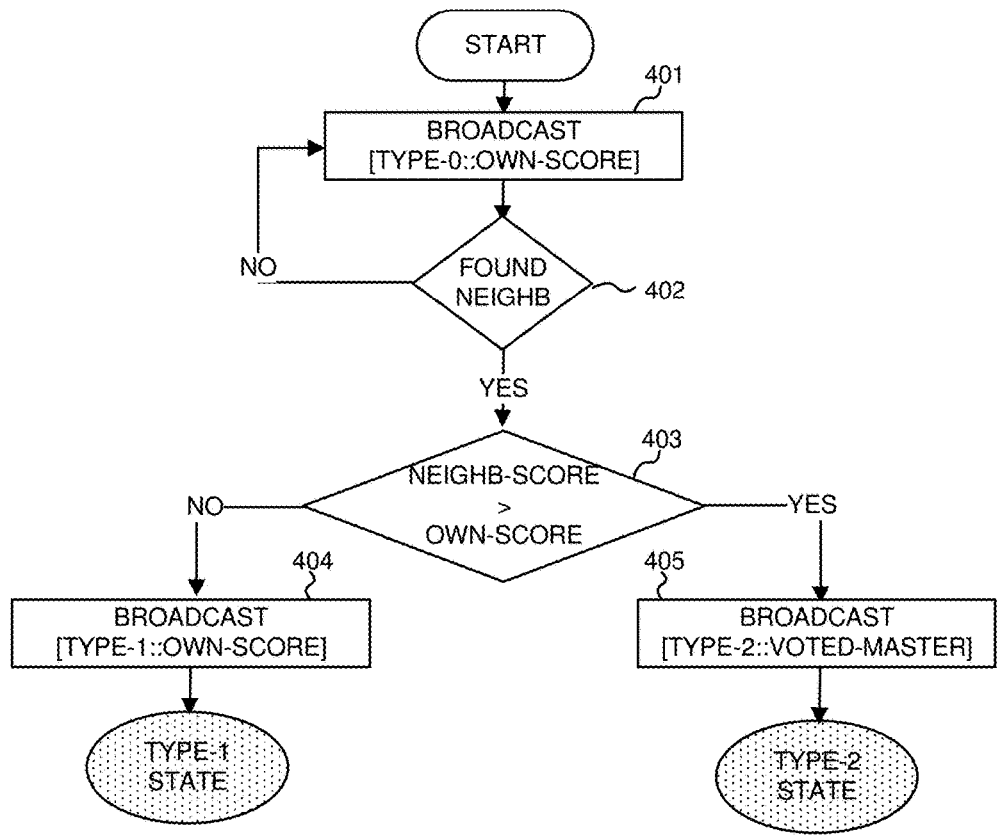
FIG. 4 shows an exemplary initialization flow chart of the peer discovery process in accordance with embodiments of the current invention.

The discovery process evolves progressively due to more neighbors being found over time. FIG. 4 shows an exemplary initialization flow chart of the peer discovery process in accordance with embodiments of the current invention. At step 401, the UE broadcast type-0 message with its own score. In one embodiment, the UE starts to broadcast type-0 message upon receiving a user command. In another embodiment, the type-0 message can be broadcasted upon detecting predefined triggering events. At step 402, the UE monitors neighbor voting messages. If there is no neighbor found, the UE moves back to step 401 and broadcasts type-0 message. If step 402 finds a neighbor, the UE moves to step 403. At step 403, the UE determines whether the neighbor UE has a higher score than itself. If step 403 determines that the neighbor does not have higher score, the UE moves to step 404. At step 404, the UE broadcast type-1 message with its own score and votes itself to be the master UE. The UE then moves to type-1 state. If step 403 determines that the neighbor score is higher than its own score, the UE moves to step 405. At step 405, the UE votes for the neighbor UE by broadcasting type-2 message with the neighbor ID as the voted master ID.

Figure 5:
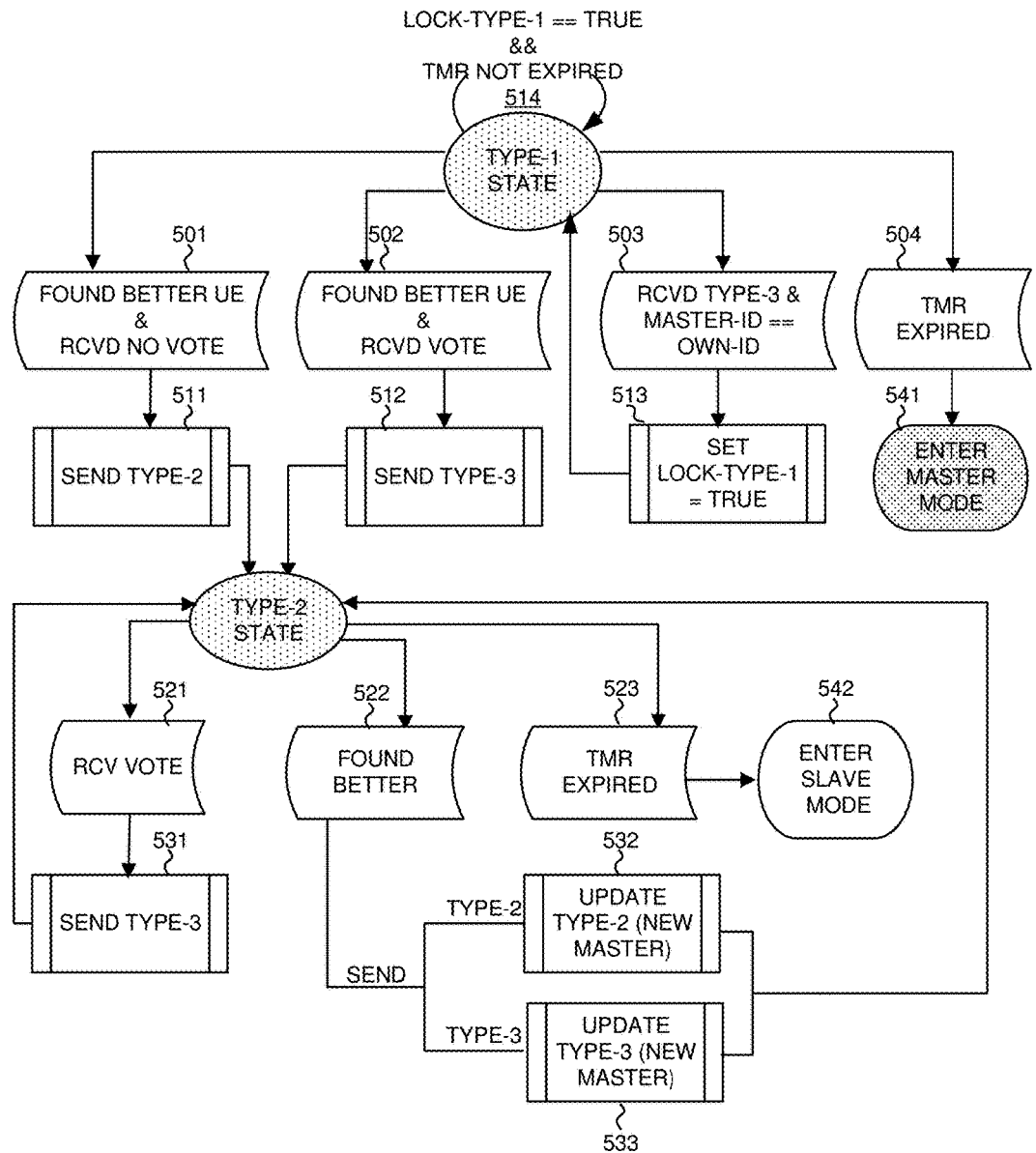
FIG. 5 further illustrates the peer discovery process with state transitions based on voting messages in accordance with embodiments of the current invention.

FIG. 5 further illustrates the peer discovery process with state transitions based on voting messages in accordance with embodiments of the current invention. After sending type-1 message, the UE enters type-1 state. The UE keeps on monitoring the voting messages from neighbor UE. If at step 501, the UE finds better neighbor than itself and determines that it did not receive votes from other UEs before, the UE moves to step 511. At step 511, the UE sends type-2 message voting the better UE to be the master UE and moves to type-2 state. If at step 502, the UE finds better neighbor than itself and determines that it receives one or more votes from one or more other UEs before, the UE moves to step 512. At step 512, the UE sends type-3 message voting the better UE to be the superior master UE and moves to type-2 state. At step 503, the UE receives a type-3 voting message and determines the superior master ID in the type-3 message is itself. At step 513, the UE set an internal flag upon receiving this type-3 message with master ID pointing to itself. For example, a flag lock-type-1 is set to be true at step 513. This flag indicates that upon completing of the voting process, the UE is locked to enter the master mode because there are other UEs solely depend on the UE to be the master. Once the flag is set, the UE stays in type-1 state. As shown, at step 514, the UE in the type-1 state stays in type-1 state upon detecting the flag lock-type-1 to be true and the timer is not expired. At step 504, if the timer expired, the UE, being currently in the type-1 state, enters master mode at step 541.

FIG. 5 also illustrates transitions for the UE in the type-2 state. If at step 521, the UE receives a vote from another UE to be the master UE, the UE moves to step 531. At step 531, the UE sends type-3 message with its current voted master UE being the superior master UE and stays in the type-2 state. If at step 522, the UE finds a better UE than its current voted master UE, the UE moves to step 532 if the UE is sending type-2 message, otherwise, if the UE is sending type-2 message, the UE moves to step 533. At step 532, the UE updates a type-2 message, sends the type-2 message and stays in the type-2 state. At step 533, the UE updates a type-3 message, sends the type-3 message and stays in the type-2 state. At step 523, if the timer expired, the UE, being currently in type-2 state, enters slave mode at step 542.

Figure 6:
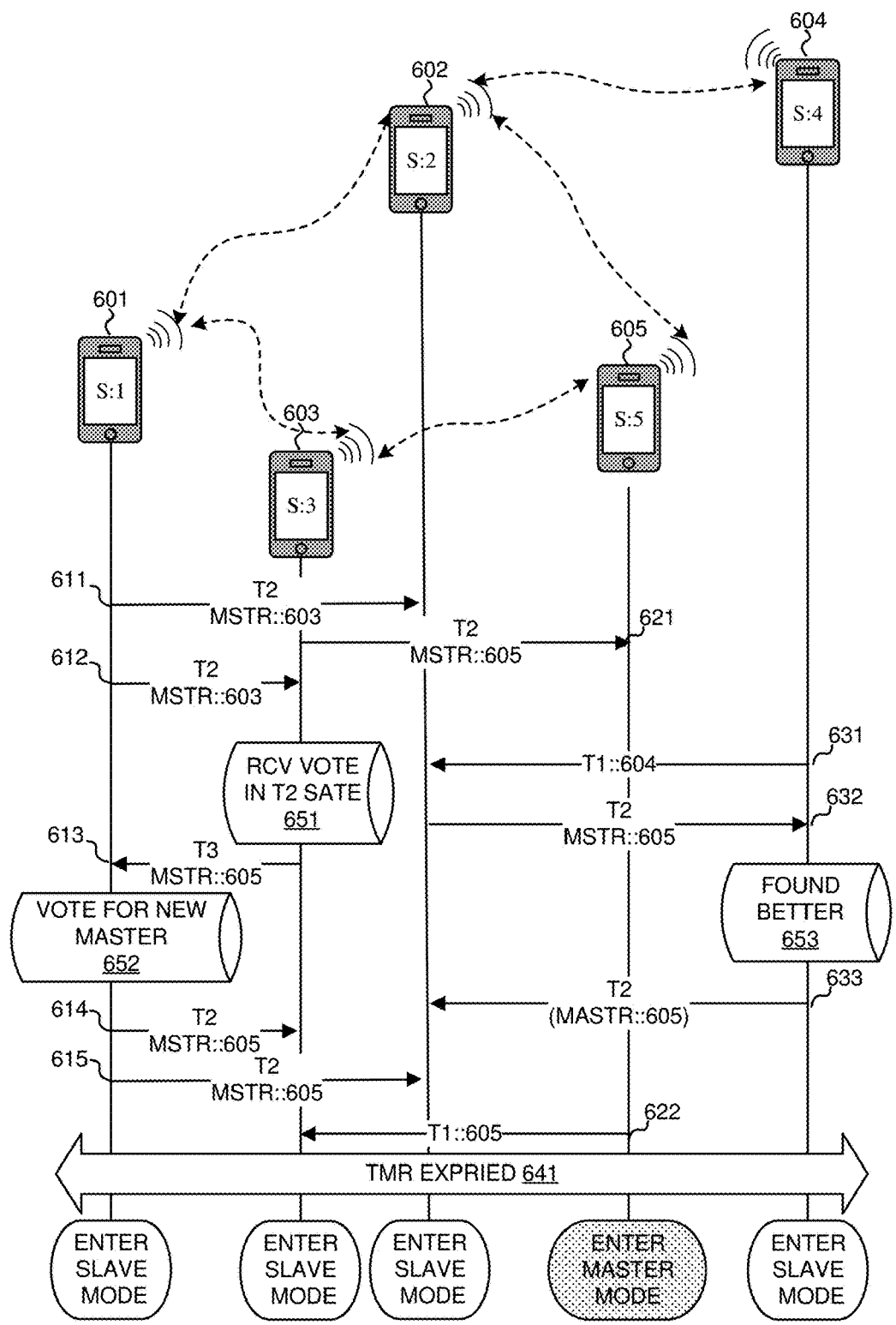
FIG. 6 is an exemplary diagram that illustrates a peer discovery process using the voting messages in accordance with embodiments of the current invention.

FIG. 6 is an exemplary diagram that illustrates a peer discovery process using the voting messages in accordance with embodiments of the current invention. Five UEs: 601, 602, 603, 604 and 605 are in proximity. For illustration purposes, assuming that UE 601 to UE 605 have ascending scores from one to five. UE 601 has UE 602 and UE 603 as its direct neighbors. UE 602 has UE 601, UE 604 and UE 605 as its direct neighbors. UE 604 only has UE 602 as its direct neighbor. UE 605 has UE 602 and UE 603 as its direct neighbors. After broadcasting and listening for some time, UE 601 votes UE 603 as the master UE and broadcasts a type-2 message with UE 603 as the voted master. At steps 611, UE 602 receives the type-2 message from UE 601. Similarly, UE 603 votes UE 605 as the master UE by sending a type-2 message with UE 605 as the voted master. At step 621, UE 605 receives the type-2 message from UE 603. At steps 612, UE 603 receives the type-2 message from UE 601 voting itself to be the master UE. At step 651, UE 603 determines that it receives a vote from its neighbor. UE 603 broadcasts a type-3 message with UE 605 as the superior master UE. At step 613, UE 601 receives the type-3 message from UE 603. At step 652, UE 601 determines to join UE 603 and votes for the new master UE by broadcasting a new type-2 message with UE 605 being the master UE. At step 614 UE 603 receives the new type-2 message from UE 601. At step 615 UE 602 receives the new type-2 message from UE 601.

FIG. 6 further illustrates a UE in type-1 state joins its neighbor UE to vote for a better UE to be the master UE. UE 604 has only UE 602 as its direct neighbor. UE 604 determines that it has higher score than UE 602 and broadcasts a type-1 message. At step 631, UE 602 receives the type-1 message from UE 604. UE 602 having UE 604 and UE 605 being its direct neighbor votes UE 605 as the master UE by broadcasting a type-2 message with UE 605 as the master UE. At step 632, UE 604 receives the type-2 message from UE 602 voting UE 605 as the master UE. Since UE 604 receives voting messages from UE 602 before, at step 653, UE 604 determines UE 605 is a better master UE. UE 604 thereby broadcasts a type-2 message with UE 605 as the master UE. UE 604 changes its state to type-2 state. At step 633, UE 602 receives the type-2 message from UE 604. UE 605 receiving votes from its neighbor UEs broadcasts type-1 message. At step 622, UE 603 receives type-1 message from UE 605.

A timer is used to control the discovery process and directs the UEs to enter either a master or slave state or to abort the process. At step 641, the discovery timer expired. UE 605 enters master mode. UE 601, 602, 603 and 604 enter slave mode. In one embodiment of the current invention, the discover process lasts for a predefined duration for each UE. In another embodiment of the current invention, the timer is adaptively updated. For example, the UE can extend or restart the timer on learning a newly joined party. For example, the UE can add a predefined value to the running timer, such as five seconds, upon learning a direct or indirect new neighbor. The UE can also set a predefined maximum timer value, such as thirty seconds. Upon expiring of the maximum timer, the UE would stop the discovery process even if new neighbors were discovered. The UE can also end the process early if the neighbors have been invariant for a predefined period. For example, when the UE has been broadcasting the same message for a predefined time, such as five seconds, the UE can determine to enter a master or slave state and terminate the process.

After the discovery process succeeds, the UE enters either the master mode or the slave mode. In one embodiment of the current invention, the master mode UE switches to Wi-Fi access point mode and the slave UEs join the master UE's wireless LAN. As illustrated in FIG. 1, multiple wireless LANs may be established by different master mode UEs.

Figure 7:
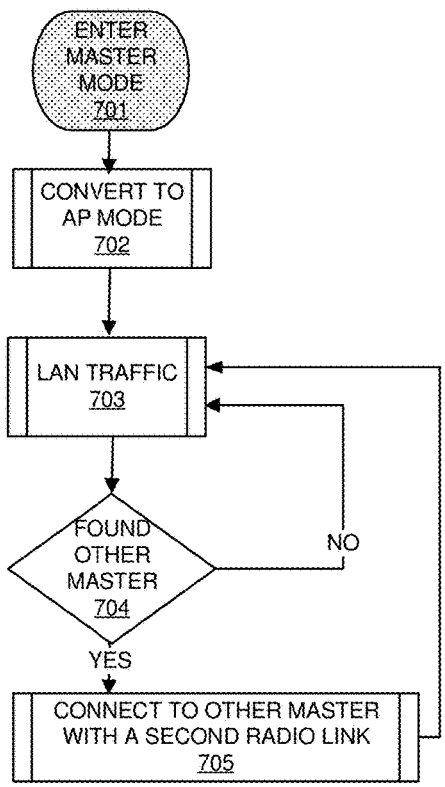
FIG. 7 is an exemplary flow chart of a UE in the master mode to establish a multi-tier LAN with other master UEs in accordance with embodiments of the current invention.
Figure 8:
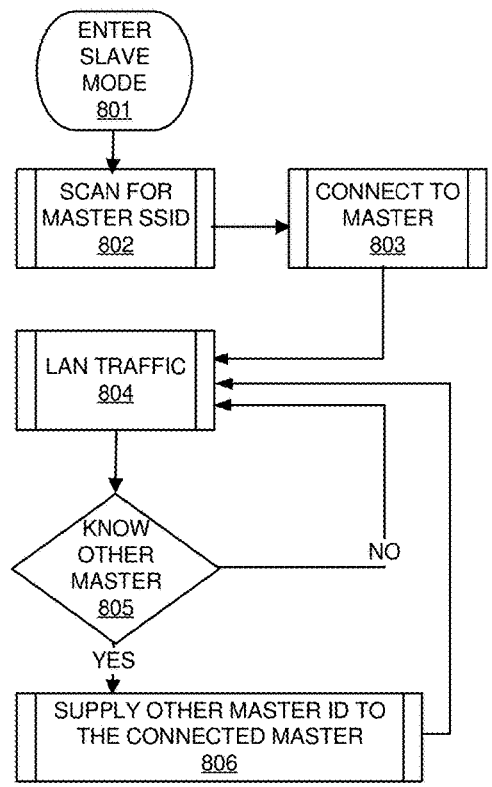
FIG. 8 is an exemplary flow chart of a UE in the slave mode to supply the master UE with IDs of other master UEs in accordance with embodiments of the current invention.

Upon the success of the discover process, one or more proximate groups are created as wireless LANs hosted by the master UEs. Depending on the physical distances from the masters, two close-by UEs may join different master UEs. However, these at-the-edge UEs have information of other master UEs. Upon connecting with its voted master UE, the slave UE may supply its master UE the ID of other master UEs. The master UE upon receiving IDs of other master UEs establishes second-tier connections with other master UEs. Since all UEs are now under a fully connected multi-tier wireless LAN, each UE may communicate with another UE directly or join a UE group to share files or live media one another. Files could be applications including games, music, photo, film, and any document. Media could be text, picture, audio, and video, etc. FIG. 7 and FIG. 8 illustrates exemplary flow charts of the establishment of such multi-tier peer LAN.

FIG. 7 is an exemplary flow chart of a UE in the master mode to establish a multi-tier LAN with other master UEs in accordance with embodiments of the current invention. At step 701, the UE enters the master mode. At step 702, the UE converts to Wi-Fi access point mode. It is noted that although Wi-Fi access point mode is used as an example here, other wireless protocols that support a master UE can also be used. At step 703, the master UE accepts connections from slave UEs and starts peer LAN traffic. At step 704, upon connected by a slave UE, the master UE determines if other master UEs are found. If step 704 determines that there is no report from the slave UE regarding other master UEs, the UE moves to step 703 and continues the peer LAN traffic. If step 704 determines other master UEs are found by the report from the slave UE, the master UE moves to step 705. At step 705, the master activates a second RF module or RF transceiver and establishes links to other master UEs. The second RF module can be any supported wireless protocols, such as Bluetooth. After establishing links to other master UEs, the master UE returns to step 703 to wait for more connections from slave UEs.

FIG. 8 is an exemplary flow chart of a UE in the slave mode to supply the master UE with IDs of other master UEs in accordance with embodiments of the current invention. At step 801, the UE enters the slave mode. At step 802, the UE scans for SSID searching for the ID of the voted master UE. Once found a matched SSID, the UE enters step 803. At step 803, the slave UE connects to the master UE. At step 804, the slave UE connects with master UE and starts peer LAN traffic. At step 805, upon connecting with the master UE, the slave UE determines if it has information of other master UEs. If step 805 determines that it does not have such information, the slave UE moves to step 804 and continues the peer LAN traffic. If step 805 determines it has information about other master UEs are, the slave UE moves to step 806. At step 806, the slave UE supplies the information of other master UEs to its connected master UE and then returns to step 804 to continue the peer LAN traffic.

The discovery protocol provides an efficient way to get relative location information for users in proximity without relying on other network services. To use acoustic signals for broadcasting and decoding by multiple users, interferences must be minimized. The requirements of using inaudible frequency bands with existing hardware in mobile devices limit the number of available ultrasonic frequency bands. Without knowing the frequency selection of other users, it is impossible to choose a frequency band in the limited set without collision. In one novel aspect, frequency hopping is used to minimize interferences among users. In one embodiment, each UE uses a random sequence for frequency hopping. One randomly selected frequency band is used throughout the duration of single message broadcasting. In case of one or more mobile devices randomly pick the same frequency at the same time, the receiving mobile devices discard the corrupted message and wait for the next message. With multiple transmissions on different randomly selected frequency band, the message can be received without corruption. Other algorithms can be used for frequency hopping.

Further, in a multi-user environment, users with too strong signals cause large interferences. In one novel aspect, an adaptive mechanism is used for signal strength/volume control. In one embodiment, the UE adaptively adjust the transmitting volume based on the number of detected neighbors. When the number of users reaches a predefined number, the volume is decreased. When the number of detected neighbors is lower than a predefined number, the volume is increased. The broadcasting volume is adaptively adjusted based on the number of detected neighbors according to an algorithm. The algorithm can be predefined or dynamically configured.

Figure 9:
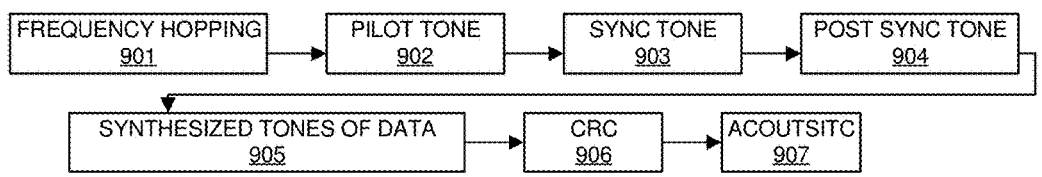
FIG. 9 is a top-level encoding scheme to minimize interferences from multi-user ultrasonic signal transmission in accordance with embodiments of the current invention.
Figure 10:
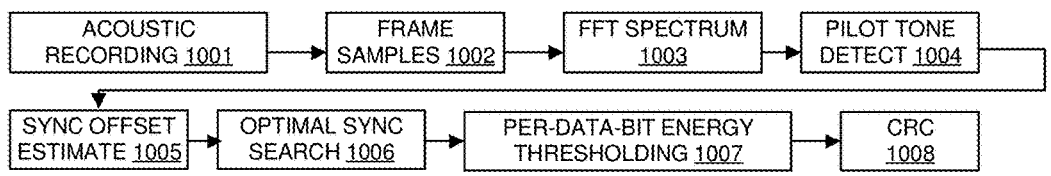
FIG. 10 is a top-level decoding scheme to minimize interferences from multi-user ultrasonic signal transmission in accordance with embodiments of the current invention.

Furthermore, synchronization is important to minimize interferences. The duration of the transmission is an important factor that leads to collision, the longer the transmission time, the higher the probability overlapping with messages from other UEs, and thus, the higher the probability of collisions. To shorten the transmission time, signal synchronization needs to be highly accurate such that the inter-symbol interference resulting from adjacent data is minimized. FIG. 9 and FIG. 10 illustrate the top-level encoding and decoding schemes respectively to minimize interferences from multi-user ultrasonic signal transmission.

FIG. 9 is a top-level encoding scheme to minimize interferences from multi-user ultrasonic signal transmission in accordance with embodiments of the current invention. At step 901, a frequency-hopping algorithm is used to select a frequency band for the encoded message. In one embodiment of the current invention, the frequency-hopping algorithm randomly selects a frequency band for each message. At step 902, a pilot tone is generated. The pilot tone is a long duration tone, which gives notification to the receiver to be ready to synchronize with the sender. In one embodiment, a twelve-frame long least significant bit (LSB) pilot tone is used for preamble. At step 903, the sync-tone is generated immediately after the end of the pilot tone. The sync-tone is used to align the frame boundaries for the receiver. In one embodiment, the sync-tone is a one-frame most significant bit (MSB). At step 904, the post-synchronization tone is generated. The post-sync tone is immediately after the sync-tone and immediately before the first byte of data. Post-sync tone is used to avoid interference when the first byte of data with a MSB or LSB tone, which interferes the energy ratio of sync-to-pilot tone. The accuracy of the energy ratio of sync-to-pilot tone is crucial because it is used to determine the tone boundary. In one embodiment, the post-sync tone is not needed when the pilot tone and the sync tone are both in different frequency bands to the frequency band of the data tone. At step 905, the data tone is generated. All data are sent byte by byte, synthesized from frequency components corresponding to bit positions and values. Each frame contains one byte of information. At step 906, CRC is inserted for data integrity check at the receiver. At step 907, acoustic signal is generated.

FIG. 10 is a top-level decoding scheme to minimize interferences from multi-user ultrasonic signal transmission in accordance with embodiments of the current invention. At step 1001, acoustic signal is received and recorded with the commonly available acoustic receivers in mobile devices. At step 1002, the received frames are sampled. At step 1003, each recorded frame is processed by Fast Fourier Transform (FFT) algorithm to obtain the spectrum of the frame. At step 1004, the receiver starts pilot tone detection. The receiver keeps on searching for the pilot tone, such as LSB, and maintains a run-length. The run-length is increased by one for each consecutive LSB detected and reset to zero if LSB is not found in the current decoded frame. Once a sufficient long pilot tone is detected, the receiver leaves pre-amble state and enters post-amble state to wait for the sync tone. The sync-tone is immediately after the end of the long-duration pilot tone. Upon detecting the sync tone, at step 1005, a sync-offset is estimated to the pilot-sync tone boundary. At step 1006, the optimal sync search is performed to optimize the locating of the tone boundary. At step 1007, the per-data-bit energy threshold is performed to decode the data. At step 1008, CRC is checked to ensure the integrity of the received data.

Figure 11:
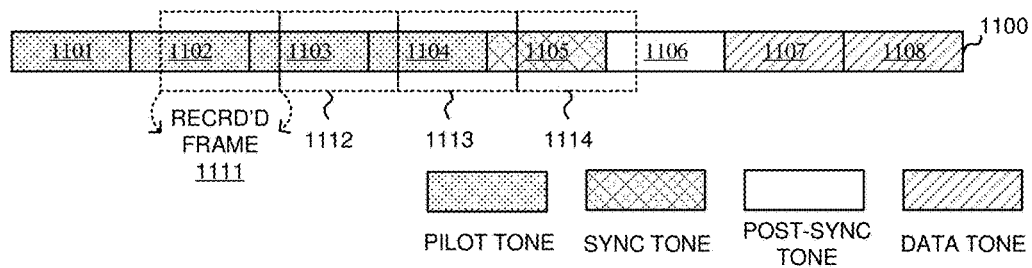
FIG. 11 illustrates the asynchronous transmission and receiving frame boundaries in accordance with embodiments of the current invention.
Figure 12:
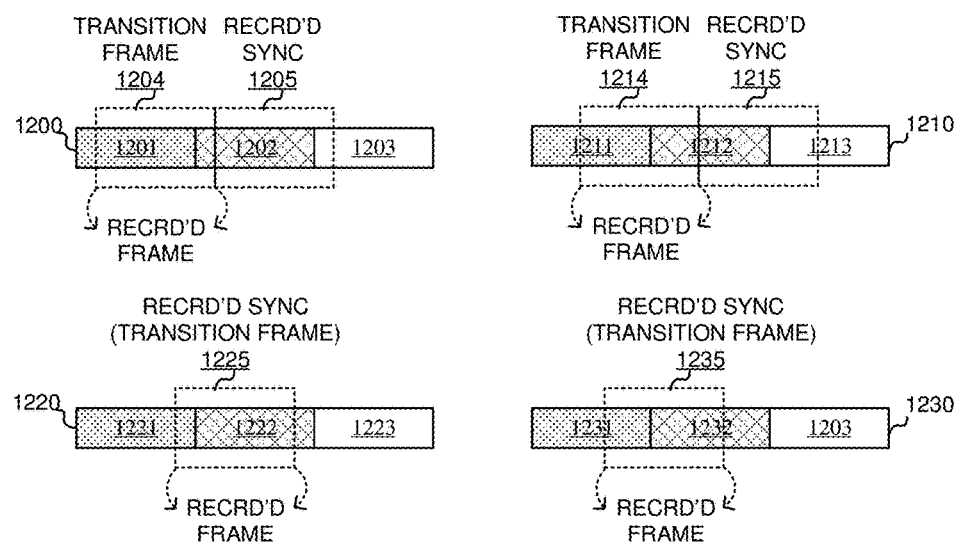
FIG. 12 illustrates the methods to identify an estimated transmitted frame boundary in accordance with embodiments of the current invention.
Figure 13:
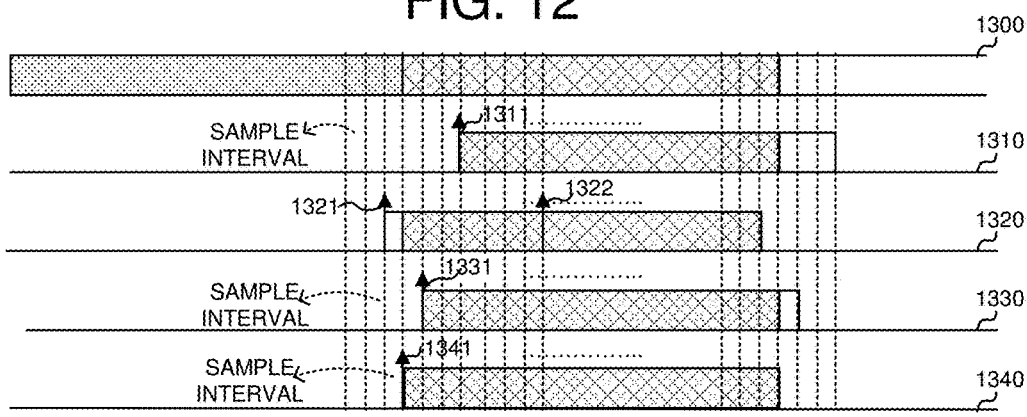
FIG. 13 illustrates the methods to optimize the pilot-sync tone boundary to the granularity of a sampling interval in accordance with embodiments of the current invention.

Once the pilot tone and the sync tone frames have been detected, the receiver needs to find the accurate tone boundary between the pilot tone and the sync tone. FIG. 11, FIG. 12 and FIG. 13 illustrates methods to identify the tone boundary for synchronization.

FIG. 11 illustrates the asynchronous transmission and receiving frame boundaries in accordance with embodiments of the current invention. A data stream 1100 includes multiple transmitted frames. Frames 1101, 1102, 1103 and 1104 are pilot tone frames. Frame 1105, immediately after the last pilot tone frame 1104, is the one-frame sync-tone frame. Frame 1106, immediately after the sync-tone frame 1105, is a post-sync tone frame. Data frames 1107 and 1108 are immediately after the post-sync tone frame 1106. Since messages are received asynchronously, the recorded frames at the receiver side are not synchronized with the transmitted frame boundary. Recorded frames 1111, 1112, 1113 and 114 are not aligned with the transmitted frames. The receiver performs synchronization procedures to realign the frame boundaries.

FIG. 12 illustrates the methods to identify an estimated transmitted frame boundary in accordance with embodiments of the current invention. The receiver first searches for sufficiently long pilot frames. Once the pilot tone frames are detected, the receiver searches for a recorded sync frame, which is defined as a recorded frame that has more sync tone samples than pilot tone samples. FIG. 12 shows different scenarios to identify the recorded sync frame. A data stream 1200 contains a pilot tone frame 1201, a sync tone frame 1202 and a data tone frame 1203. Recorded frame 1204 contains both pilot tone samples and sync tone samples. Recorded frame 1204 contains much more pilot tone samples than sync tone samples. Therefore, the receiver detects that the recorded frame 1205 immediately after the current recorded frame 1204 is the recorded sync frame. Therefore, recorded frame 1204 is called the transition frame. Similarly, a data stream 1210 contains a pilot tone frame 1211, a sync tone frame 1212 and a data tone frame 1213. Recorded frame 1214 contains both pilot tone samples and sync tone samples. Recorded frame 1214 contains about the same amount of pilot tone samples and sync tone samples. Since there are slightly more pilot tone samples than sync tone samples in recorded frame 1214, the receiver determines that the recorded frame 1215 immediately after the current recorded frame 1214 is the recorded sync frame. Therefore, recorded frame 1214 is called the transition frame. Data streams 1220 and 1230 show different scenarios.

A data stream 1220 contains a pilot tone frame 1221, a sync tone frame 1222 and a data tone frame 1223. Recorded frame 1225 contains both pilot tone samples and sync tone samples. Recorded frame 1225 contains much more sync tone samples than pilot tone samples. The receiver determines that the current recorded frame 1225 is the recorded sync frame as well as the transition frame. Similarly, a data stream 1230 contains a pilot tone frame 1231, a sync tone frame 1232 and a data tone frame 1233. Recorded frame 1235 contains both pilot tone samples and sync tone samples. Recorded frame 1225 contains slightly more sync tone samples than pilot tone samples. The receiver determines that the current recorded frame 1235 is the recorded sync frame as well as the transition frame.

Once identifying the recorded sync frame, the receiver determines the energy ratio of the sync tone to the pilot tone by calculating the ratio of the FFT magnitude corresponding to the two tones in the transition frame. The sync-to-pilot tone energy-ratio is used to estimate the offset of transmission sample. Purely relied on the received energy ratio for offset estimation is not accurate because the physical attenuation of signal is not uniform over different frequency bands. To improve the accuracy of the estimation, receiver must consider the frequency bands of the received tones and adjust the energy ratio calculation accordingly. In novel aspect, the receiver uses a pre-calculated table of one-frame sync-to-pilot tone energy-ratio values with respect to each boundary-offset for each frequency band. At run time, the receiver uses the frequency band and the measured sync-to-pilot tone energy-ratio to do a reversed table lookup of the boundary-offset. An estimated boundary-offset index is returned.

To get an accurate tone boundary further progressive synchronization procedure is followed to locate the beginning of the transition to the granularity of samples. The first step is to identify the transition frame as shown in FIG. 12. Second, the receiver estimates the boundary-offset index based on the sync-to-pilot tone energy-ratio through a reversed table lookup. Third, an iterated optimization procedure is performed to locate the tone boundary more accurately by iterating through different sample indices to find an index that result in the maximum sync tone energy when counting one frame of samples starting from the estimated sample index of tone boundary.

FIG. 13 illustrates the methods to optimize the pilot-sync tone boundary to the granularity of a sampling interval in accordance with embodiments of the current invention. The illustration assumes a very small search range for simplicity in explaining following steps. A data stream 1300 contains a pilot frame, a sync frame and a data frame. At step 1310, the receiver starts the optimization process. Index 1311 is the estimated tone boundary based on the sync-pilot energy ratio. The algorithm calculates the total sync-tone energy of the frame-long of samples starting from index 1311. At step 1320, the algorithm uses index 1321, starting 4 samples ahead of index 1311, and index 1322, starting 4 samples latter of index 1311, as the initial search boundaries. It compares the sync energies of the frame-long of samples starting from indices 1321 and 1322 and determines the energy starting from index 1321 is larger than the energy starting from index 1322. As a result, indices 1311 and 1321 are picked as the new search boundaries. At step 1330, the search algorithm generates an index 1331 inside the new search boundaries and calculates the sync energy starting from index 1331. It then determines which two indices having the higher sync energy and uses them as the new search boundaries of the next iteration. Repeat iterations similar to step 1330 until the search boundaries overlap at index 1341 in step 1340. The algorithm by now has converged to obtain the peak sync-tone energy at index 1341 and the receiver therefore accurately locates the tone boundary, which is most likely the transmitted frame boundary. In one embodiment, the search algorithm is a binary search so that the index 1331 is always chosen the middle index of the search boundaries.

Figure 14:
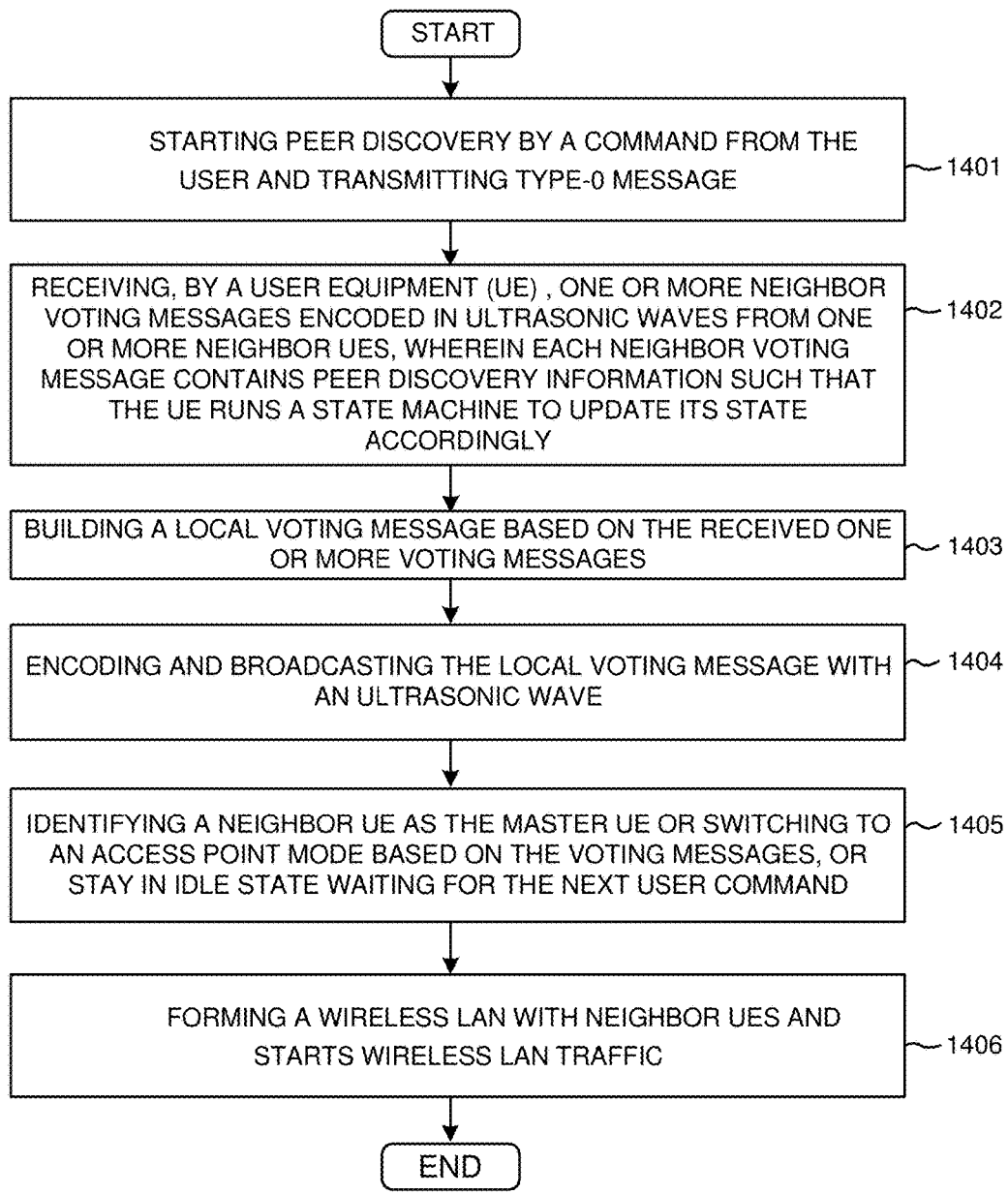
FIG. 14 is an exemplary flow chart of peer discovery using ultrasonic messaging in accordance with the current invention.

FIG. 14 is an exemplary flow chart of peer discovery using ultrasonic messaging in accordance with the current invention. At step 1401, the UE starts peer discovery by a command from the user and then begins transmitting type-0 message. At step 1402, the UE receives one or more neighbor voting messages encoded in ultrasonic waves from one or more neighbor UEs, wherein each neighbor-voting message contains peer discovery information such that the UE runs a state machine to update its state accordingly. At step 1403, the UE builds a local-voting message based on its state and the received voting messages. At step 1404, the UE encodes and broadcasts the local voting message with an ultrasonic wave. At step 1405, the state machine has reached a predefined timeout and each UE converts into either the master mode or the slave mode. Alternatively, if no valid voting message received, a UE remains in the silent (idle) state waiting for the next round discovery commanded by the user. At step 1406, master UEs establish wireless LANs with their voting slave UEs and form a second-tier networking with other master UEs.

Figure 15:
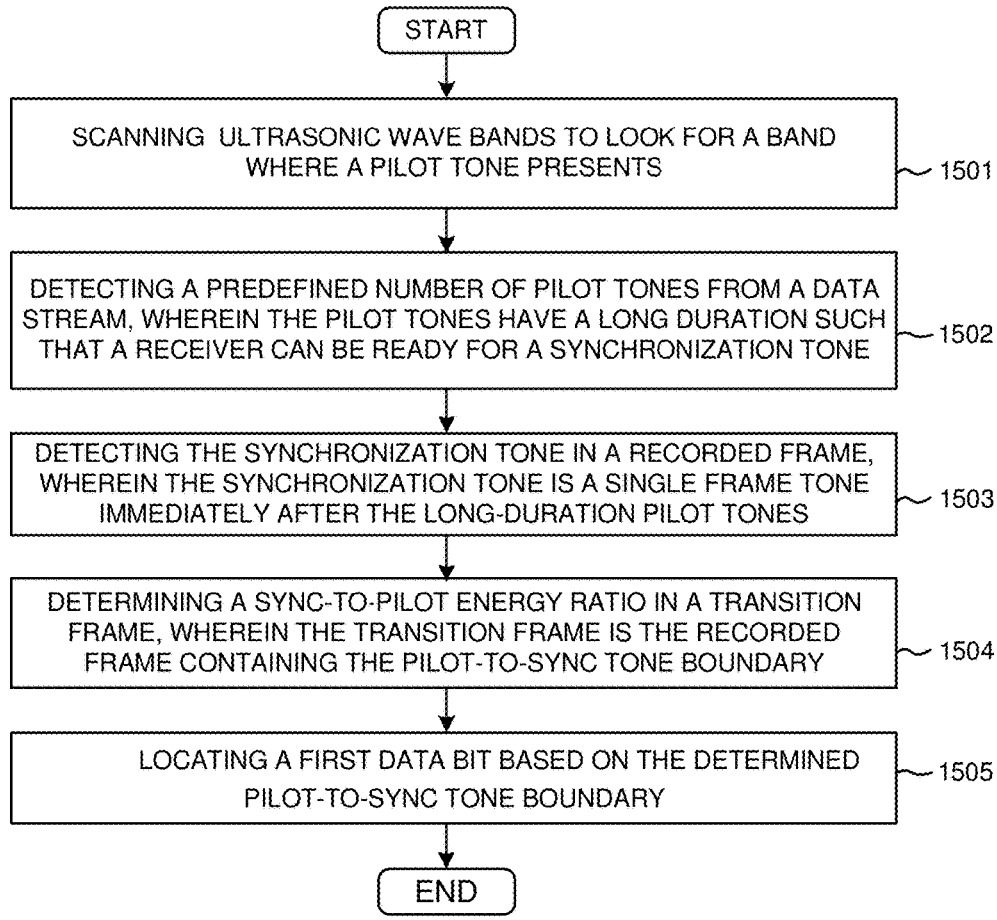
FIG. 15 is an exemplary flow chart of optimized synchronization for ultrasonic messaging system in accordance with the current invention.

FIG. 15 is an exemplary flow chart of optimized synchronization for ultrasonic messaging system in accordance with the current invention. At step 1501, the UE scans ultrasonic wave bands to look for a band where a pilot tone presents. At step 1502, the UE detects a predefined number of pilot tones from a recording stream, wherein the pilot tones have a long duration such that a receiver can be ready for a synchronization tone. At step 1503, the UE detects the synchronization tone in a recorded frame, wherein the synchronization tone is a single frame tone immediately after the long-duration pilot tones. At step 1504, the UE determines a sync-to-pilot tone energy-ratio in a transition frame, wherein the transition frame is the recorded frame containing the pilot-to-sync tone boundary. At step 1505, the UE locates a first data bit based on the determined tone boundary.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a recording stream by a user equipment (UE) in a multi-user wireless network;
   detecting a predefined number of pilot tones from the recording stream, wherein the pilot tones have a long duration such that a receiver can be ready for a synchronization tone;
   detecting the synchronization tone in a recorded frame, wherein the synchronization tone is a single frame tone immediately after the long-duration pilot tones;
   determining a sync-to-pilot tone energy-ratio in a transition frame, wherein the transition frame is the recorded frame containing a pilot-to-sync tone boundary;
   locating a first data bit of a received data stream based on the determined transition frame, wherein Cyclic Redundancy Code (CRC) is checked to ensure an integrity of the received data stream.

2. The method of claim 1, wherein the first data bit is immediately after the synchronization tone frame when the pilot tone and the synchronization tone are on different frequency bands to a data band, otherwise, the first data bit is immediately after a post synchronization frame, wherein the post synchronization frame is a single frame tone immediately after the synchronization tone.

3. The method of claim 2, further comprising:
   reversed-looking up a boundary-offset table to determine an estimated pilot-sync tone boundary between the transmitted pilot tone frame and the synchronization tone frame, wherein the boundary-offset table lists pre-calculated one-frame sync-to-pilot tone energy-ratio values in the granularity of a sampling interval based on a frequency band of the pilot tone, a frequency band of the synchronization tone, and the offset sampling intervals to the tone boundary.

4. The method of claim 3, further comprising:
searching a maximum synchronization tone energy with one frame worth samples in the vicinity of the estimated pilot-sync tone boundary using a predefined search algorithm; and
determining an optimized pilot-sync tone boundary based on the search.

5. The method of claim 4, wherein the predefined search algorithm is a binary search.

6. A user equipment (UE), comprising:
a first transceiver that transmits and receives radio signals in a wireless network;
an acoustic receiver that receives acoustic signals from one or more acoustic transmitters;
an acoustic transmitter that transmits acoustic signals; and
a synchronization module that receives a recording stream in the wireless network; detects a predefined number of pilot tones from the recording stream, wherein the pilot tones have a long duration such that a receiver can be ready for a synchronization tone; detects the synchronization tone in a recorded frame, wherein the synchronization tone is a single frame tone immediately after the long-duration pilot tones; determines a sync-to-pilot tone energy-ratio in a transition frame, wherein the transition frame is the recorded frame containing a pilot-to-sync tone boundary; and locates a first data bit of a received data stream based on the determined transition frame, wherein Cyclic Redundancy Code (CRC) is checked to ensure an integrity of the received data stream.

7. The UE of claim 6, further comprising:
a boundary-offset table that lists pre-calculated one-frame sync-to-pilot tone energy-ratio values in the granularity of a sampling interval based on a frequency band of the pilot tone, a frequency band of the synchronization tone, and the offset sampling intervals to the tone boundary, and wherein the synchronization module determines an estimated pilot-sync tone boundary by reversed-looking up the boundary-offset table.

8. The UE of claim 7, further comprising:
an optimizer that searches a maximum synchronization tone energy with one-frame worth of samples in the vicinity of the estimated pilot-sync tone boundary using a predefined search algorithm and determines an optimized pilot-sync tone boundary based on the search.

9. The UE of the claim 8, wherein the predefined search algorithm is a binary search.

* * * * *